United States Patent [19]

Kinzer

[11] 4,142,975

[45] Mar. 6, 1979

[54] APPARATUS FOR THE TREATMENT OF SEWAGE

[75] Inventor: Jay Kinzer, Denver, Colo.

[73] Assignee: Sanilogical Corporation, Denver, Colo.

[21] Appl. No.: 836,375

[22] Filed: Sep. 26, 1977

[51] Int. Cl.² .............................................. C02C 1/08
[52] U.S. Cl. ................................ 210/195 R; 210/197; 210/201; 210/220
[58] Field of Search ....... 210/14, 15, 8, 3, 194–198 R, 210/199–202, 220, 221 R, 221 P, 252, 206, 170

[56] References Cited

U.S. PATENT DOCUMENTS

| 3,706,380 | 12/1972 | Le Quinquis | 210/197 |
| 4,036,754 | 7/1977 | Peasley | 210/220 |
| 4,070,292 | 1/1978 | Adams | 210/220 |

*Primary Examiner*—Thomas G. Wyse
*Assistant Examiner*—Benoît Castel
*Attorney, Agent, or Firm*—Bruce G. Klaas; Dennis K. Shelton

[57] ABSTRACT

An apparatus for treating sewage to obtain substantially complete organic matter substrate and biological sludge oxidation prior to effluent discharge in a treatment system comprising a series of treatment units; each unit having a generally circular cross-sectional configuration defining a treatment chamber, baffle means in the treatment chamber for directing the flow of mixed liquor in the chamber, gas supply means for supplying an oxygen containing gas to the treatment chamber so as to cause a continuous semi-circular flow pattern of mixed liquor in the treatment chamber; inlet means for supplying raw sewage to the first unit of the series; outlet means for withdrawing clarified effluent from the last unit of the series; and fluid communication means for providing fluid communication between an intermediate top portion of each successive unit of the series. The system is preferably designed to provide environments suitable for microorganism growth and development through sewage organic matter consumption in the first unit of the series, microorganism population maintenance in the next successive unit of the series and microorganism autodigestion in latter units of the series, thereby providing an effluent substantially free of digestable organic matter and biological sludge.

7 Claims, 10 Drawing Figures

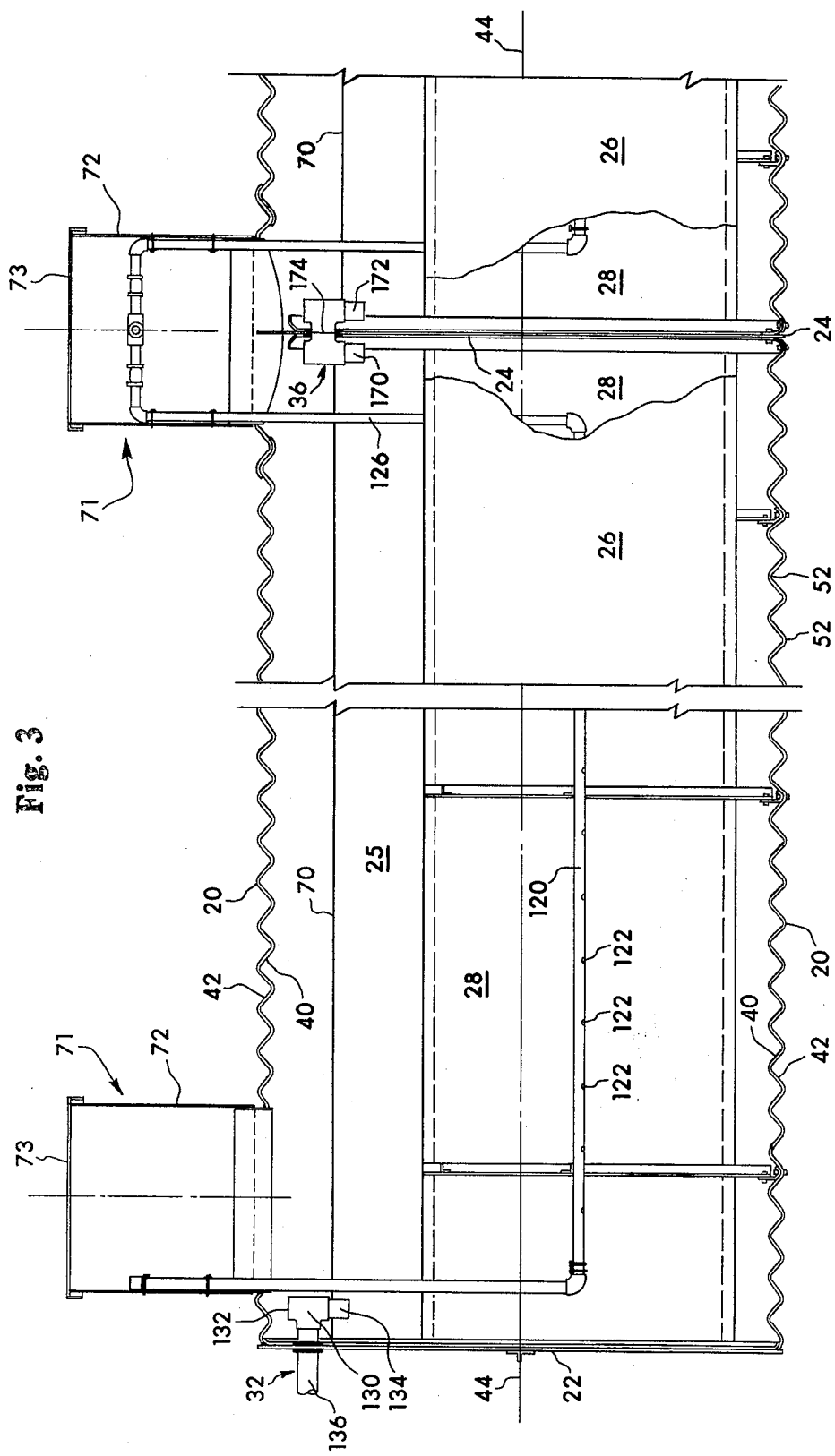

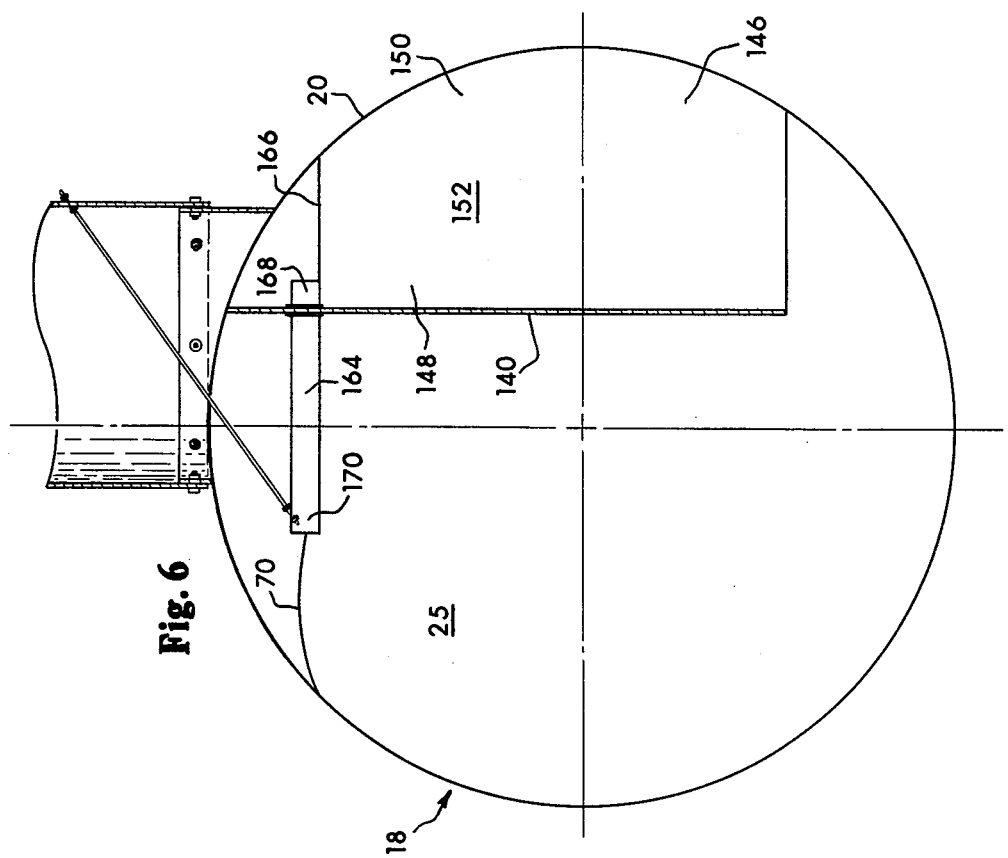
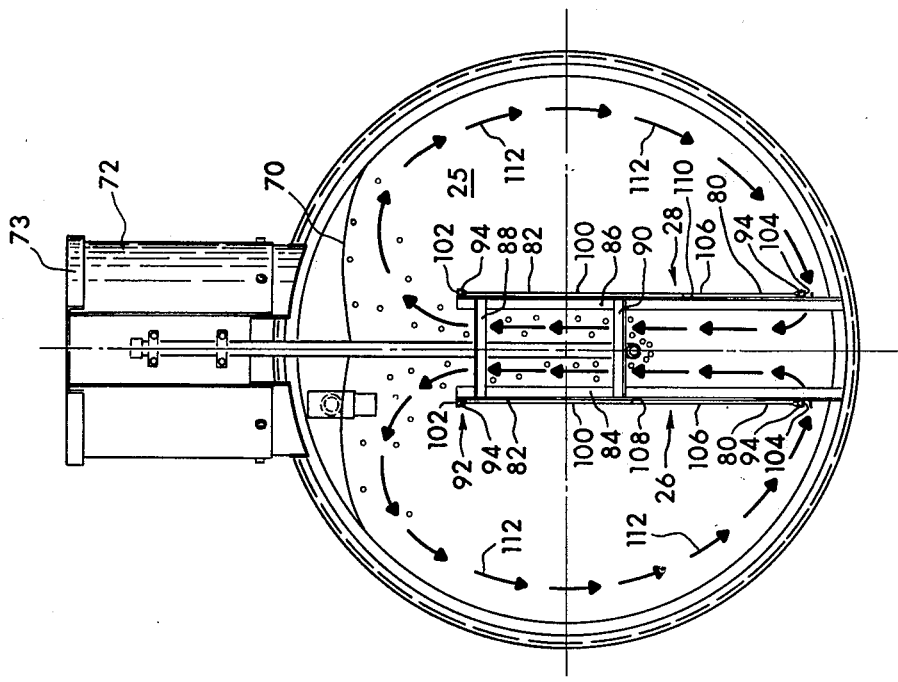

APPARATUS FOR THE TREATMENT OF SEWAGE

BACKGROUND AND SUMMARY OF THE INVENTION

This invention relates to biological waste treatment systems and more particularly to an apparatus for treating sewage wastes through consumption of organic matter in the waste materials and reduction of microorganism content prior to effluent discharge.

Sewage wastes, particularly those of human origin, are conventionally treated with aerobic, organic matter consuming microorganisms to obtain a reduction in noxious substances in the sewage. For example, in the well known activated sludge process, raw sewage is commonly fed to one or more treatment chambers where it is agitated in the presence of oxygen and aerobic microorganisms (biological sludge). The microorganisms feed on the organic matter substrate in the sewage, and under a suitable balance of organic matter, oxygen and microorganisms, will substantially reduce the organic matter content of the sewage while growing and significantly increasing in population size. After an appropriate reaction period, the mixed liquor of treated sewage and microorganisms is typically transferred to a settling vessel where the microorganisms are allowed to settle from the mixed liquor to form a concentrated mass of the biological sludge. The supernatant from this settling process is discharged from the system as a "clarified effluent." A first portion of the settled biological sludge is then typically recycled to the treatment chamber to act as a microorganism charge in the treatment of incoming raw sewage, while a second portion of the settled sludge must typically be subjected to further prolonged treatment prior to disposal.

The foregoing activated sludge process, while effective in certain respects, has several disadvantages. For example, a portion of the sludge must be recycled to the sewage treatment chamber, requiring a significant capital investment in recycling equipment as well as continuing maintenance expenditures. In addition, in order to operate efficiently, the ratio of incoming raw sewage to recycled sludge must be carefully controlled, requiring continuous monitoring by skilled personnel of the incoming sewage wastes to control the amount of recycled sludge and maintain the desired operating parameters of the system. In addition, the sludge which is not recycled must be further treated and disposed of in a conventional manner, requiring additional treatment, transportation and disposal expenditures.

In order to overcome the foregoing problems, it has previously been suggested to extend the treatment time of the raw sewage in the presence of oxygen. After the microorganisms have depleted a substantial portion of the organic matter substrate as a food source from the sewage, the microorganisms in the presence of oxygen shift from a phase of growth and reproduction to a phase of autodigestion wherein they undertake endogenous respiration and/or intercell cannibalization, both yielding a reduction in the mass of microorganisms and a reduction in the amount of resulting biological sludge produced by the treatment system. For example, U.S. Pat. No. 3,694,353 of Yang, et al purports to relate to such a system. While the extended aeration process has shown a degree of promise in overcoming the sludge removal and recycling problems inherent in the conventional activated sludge process, prior methods and apparatus for carrying out this process have been found to be lacking in certain respects. For example, the efficiency of obtaining total oxidation of organic matter and biological sludge in a sewage treatment process is highly dependent upon obtaining a thorough and complete, uniform, continuous mixing of mixed liquor and suspended solids in the system with an oxygen containing gas, a problem which has not been solved by prior apparatus designs. In addition, in order to obtain complete aerobic sludge autodigestion, it is necessary to provide means for forcing the microorganism population into the autodigestive phase at a location removed from the organic matter food source, i.e., the input for raw sewage.

It has now been determined that the foregoing problems can be overcome and that a sewage treatment system that provides for complete, intimate, continuous contacting and intermixing of oxygen throughout mixed liquor in the system and completely eliminates the need for biological sludge recycling and routine biological sludge removal is obtained by methods and apparatus comprising a series of treatment units, each unit comprising an elongated sidewall of generally circular cross sectional configuration, first and second endwalls mounted in fluid tight engagement with opposite ends of the sidewall to form a generally cylindrically shaped sewage treatment chamber therewithin, first and second baffle means vertically mounted in spaced relationship in the sewage treatment chamber longitudinally of and on opposite sides of the longitudinal central axis of the sidewall and in spaced relationship relative to the sidewall for directing the flow of mixed liquor within the sewage treatment chamber; gas supply means for supplying an oxygen containing gas to the treatment chamber at a location intermediate the first and second baffle means in a lower portion of the treatment chamber to cause mixed liquor in the treatment chamber to rapidly rise vertically upward between the first and second baffle means and then circumferentially outward and downward in a semicircular flow path defined by the interior surface of the sidewall to the bottom of the treatment chamber and then vertically upward again between the first and second baffle means; inlet means for supplying raw sewage to the first unit of the series; outlet means for withdrawing clarified effluent from the last unit of the series; and fluid communication means for maintaining an upper liquid level in the treatment chamber of each unit of the series and for providing serial fluid communication between an intermediate top portion of each successive unit of the series.

The system provides for a uniform, complete and thorough intermixing of mixed liquor and suspended solids throughout each treatment chamber thereby eliminating the settling of any biological sludge in the apparatus, and additionally provides for uniform dispersal and intimate contacting of oxygen in the gas with mixed liquor and suspended solids throughout the treatment chamber thereby providing a suitable environment for continuous aerobic activity of microorganisms in the mixed liquor. Serial fluid communication between units of the series provides an environment suitable for organic matter substrate consumption and microorganism generation and development in an initial unit of the series adjacent the raw sewage inlet means, an environment suitable for microorganism population maintenance in an intermediate unit of the series, and an environment suitable for forced autodigestion of the microorganisms in latter units of the series, thereby eliminating biological sludge produced in the microorganism development phase.

BRIEF DESCRIPTION OF THE DRAWING

The inventive concepts may be more fully understood in association with the following drawing, in which:

FIG. 3 is a side elevational view in cross section of a portion of the apparatus of FIG. 1;

FIG. 5 is an end view of a treatment unit of the apparatus of FIG. 1 with an end wall removed showing illustrative baffle means for use in the apparatus of FIG. 1;

FIG. 6 is a schematic end view in cross section showing illustrative additional baffle means for use in the apparatus of FIG. 1;

DESCRIPTION OF THE INVENTION

Figure 1:
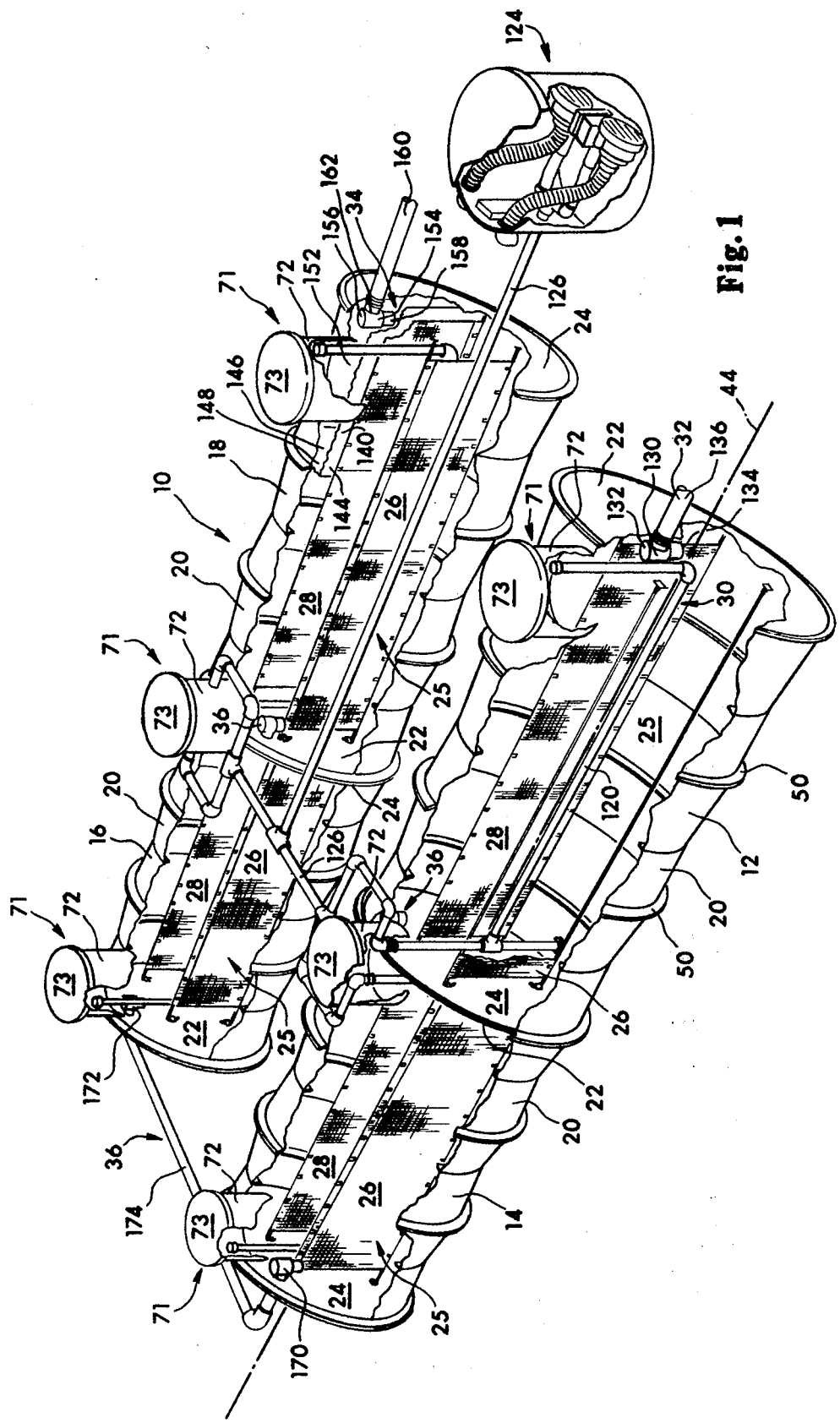
FIG. 1 is a perspective view of one embodiment of sewage treatment apparatus of the invention with portions removed.

Referring now to FIG. 1, the apparatus of the invention is shown to generally comprise a series, generally shown at 10, of sewage treatment units including a first unit 12 of the series, intermediate units 14, 16 of the series and a last unit 18 of the series. Each unit of the series comprises an elongated sidewall 20 having a generally circular cross sectional configuration; first and second endwalls 22, 24, respectively, mounted in fluid tight engagement with sidewall 20 so as to define treatment chamber 25; first and second baffle means 26, 28; gas supply means, generally shown at 30 for supplying an oxygen containing gas to the treatment chamber 25; inlet means, generally shown at 32, for supplying raw sewage to the first unit of the series; outlet means generally shown at 34, for withdrawing clarified effluent from the last unit of the series; and fluid communication means, generally shown at 36, for providing fluid communication between an intermediate top portion of each successive unit of the series.

UNIT SIDE AND END WALLS

Figure 2:
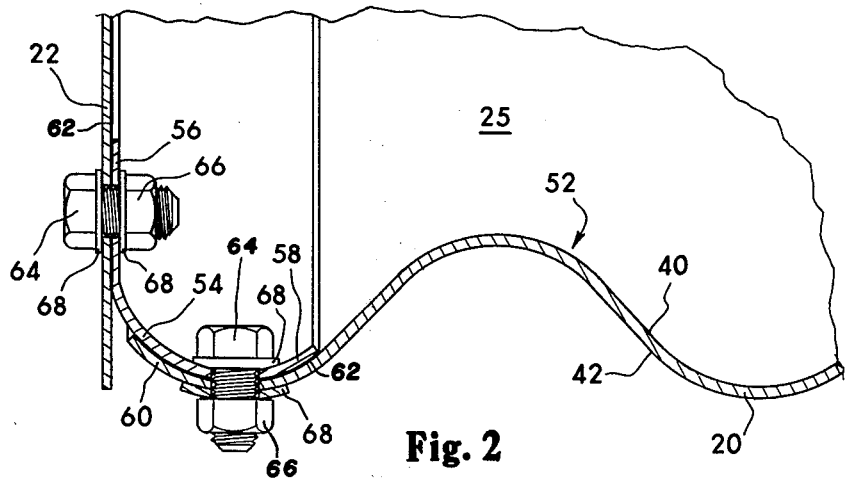
FIG. 2 is a top view in cross section of a portion of means of interconnection of the sidewall and end wall of the apparatus of FIG. 1.

Referring now to FIGS. 1-3, each unit of the series is shown to comprise an elongated sidewall 20 having a generally uniform, circular cross sectional configuration defined by relatively smooth inner sidewall surface 40 and outer sidewall surface 42. Sidewall 20 is elongated along its longitudinal, central axis 44 to define generally cylindrically shaped treatment chamber 25 as will be hereinafter further described. The sidewall 20 is preferably made of relatively thin material for ease of handling, transportation and storage, and may be structurally reinforced such as by ribs 50, FIG. 1, by corrogations 52, FIG. 2, or the like, to maintain the integrity of the sidewall in use.

Each unit of the series further comprises first and second generally planar endwalls 22, 24 adapted for fluid tight engagement with opposite end portions of the sidewall 20. Referring now to FIG. 2, when the sidewall 20 is made of illustrative corrugated material 52, end wall 22 may be mounted for fluid tight engagement on sidewall 20 by means of interconnecting wall portion 54 having a peripheral configuration generally corresponding to the peripheral configuration of sidewall 20, a generally planar portion 56 adapted for sealed engagement with end wall 22, a curved portion 58 adapted for sealed engagement with end portion 60 of sidewall 20, sealing means, such as sealant 62, for effecting a fluid tight seal between interconnecting wall portion 54 and the unit sidewall 20 or endwall 22, and fixed attachment members such as threaded bolts 64, nuts 66 and washers 68. Alternatively, endwalls 22, 24 may be integral with sidewall 20 or may be otherwise mounted for sealed engagement with sidewall 20. The unit sidewall, endwalls and interconnecting wall portions are preferably made of lightweight corrosion resistant materials such as aluminum, rigid plastics or the like, but may be made of galvanized steel or other corrosion resistant materials.

The unit sidewall 20, endwalls 22, 24 and interconnecting wall portions 54 define a sewage treatment chamber 25 having a fixed upper liquid level 70 in use, as will be hereinafter further described. In addition, each unit is preferably provided with access means 71 for providing external access to the treatment chamber of each unit of the series and for venting the portion of each treatment chamber above the upper liquid level 70 to the atmosphere. As shown in FIG. 1, access means 71 comprises relatively short length tubular member 72 mounted on an upper surface portion of sidewall 20 and having a first end portion in fluid communication with treatment chamber 25 and a second end portion in fluid communication with the atmosphere. Access means 71 further comprises cover means, such as cover 73 adapted for loose capping engagement with the second end portion of tubular members 72, for removably covering the second end portion of the tubular members while allowing built up gas accumulations in each unit of the series to escape to the atmosphere. As shown in the illustrative embodiment of FIG. 1, six such access means 71 are provided in association with the units of series 10.

FIRST AND SECOND BAFFLE MEANS

Referring now to FIGS. 1, 3, and 5, each unit of the series further comprises first and second baffle means, 26, 28, respectively, for directing the flow of mixed liquor within the treatment chamber 25. The first and second baffle means are vertically mounted in spaced relationship in the treatment chamber in spaced parallel relationship to, and on opposite sides of, central longitudinal axis 44 of sidewall 20, and extend from a lower end portion 80 located in spaced relationship to sidewall 20 vertically upward to an upper end portion 82 located somewhat beneath the upper liquid level 70 in the treatment chamber. The first and second baffle means 26, 28 have a generally rectangular peripheral configuration and preferably extend substantially from endwall 22 to endwall 24 of the treatment unit.

Referring now to FIG. 5, the baffle means may be supported in the treatment chamber by means of a subframe assembly comprising spaced, vertically extending support members 84, 86 at each end of the baffle means;

spaced, horizontally extending support members 88, 90 extending between and fixed to support members 84, 86 and attachment means 92, such as elongated rods 94 extending the length of the baffle means adjacent the lower and upper portions 80, 82 thereof, and means such as threaded bolts and nuts for attaching the baffle means to the subframe assembly. Alternatively, the first and second baffle means 26, 28 may be attached to endwalls 22, 24 of the unit.

Still referring to FIG. 5, the first and second baffle means may comprise a relatively high strength and corrosion resistant woven fibrous material 100, such as nylon or the like, having upper and lower portions 102, 104 extending around rods 94 and fixed to imtermediate generally planar relatively large area intermediate portion 106, the intermediate portion being placed under tension to form relatively rigid flow directing surfaces 108, 110. Alternatively, baffle means 26, 28 may be formed of generally lightweight, corrosion resistant solid materials, such as aluminum, plastic, or the like, which may be otherwise suitably attached to the subframe assembly or to endwalls 22, 24.

GAS SUPPLY MEANS

Figure 4:
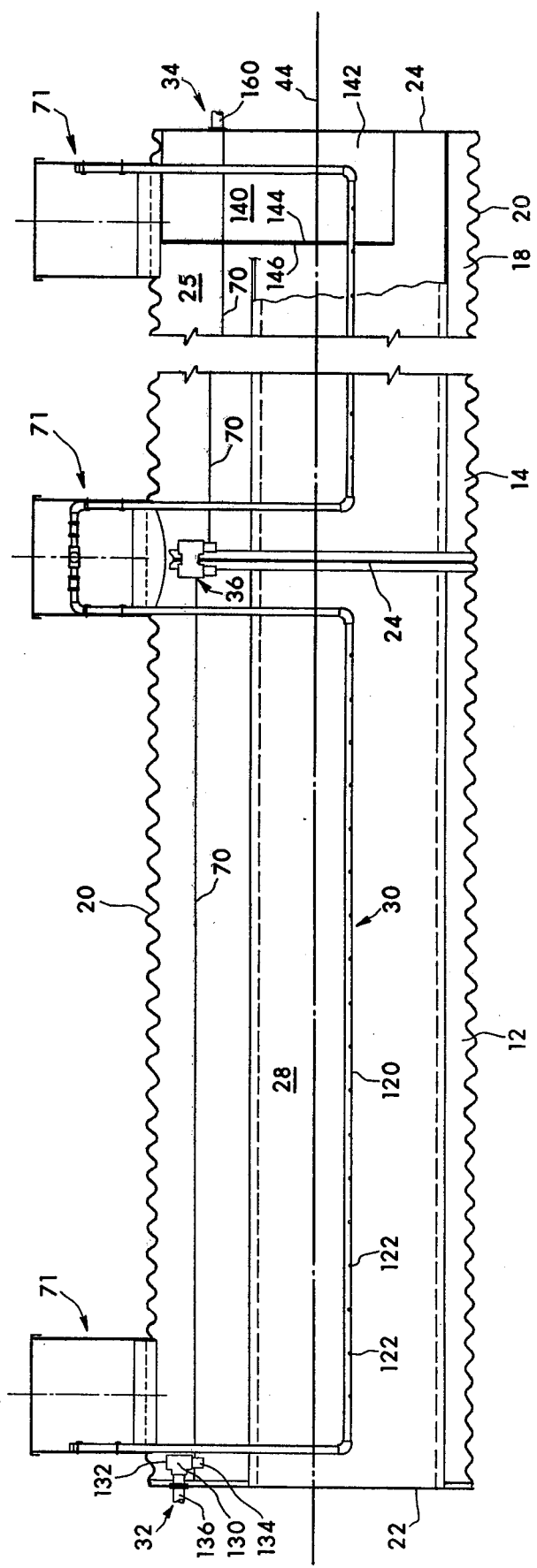
FIG. 4 is a schematic side view in cross section showing a baffle means and a portion of a gas supply means of the apparatus of FIG. 1.

Referring now to FIGS. 1, 3 and 4, each unit of the series further comprises gas supply means 30 for supplying an oxygen containing gas to the treatment chamber at a location intermediate the first and second baffle means in an intermediate lower portion of the treatment chamber. The gas supply means is located in relationship to the first and second baffle means so as to provide an adequate supply of oxygen to mixed liquor in the treatment chamber to ensure aerobic metabolism of microorganisms therein and to cause mixed liquor in the chamber to rapidly rise vertically upward between the first and second baffle means and then circumferentially outward and downward in a continuous semicircular path indicated by arrows 112 in FIG. 5 to the bottom of the treatment chamber and then vertically upward again between the first and second baffle means thereby causing a uniform, intimate and thorough mixing of the oxygen containing gas throughout the mixed liquor in the chamber and maintaining relatively heavy particulate solid matter and microorganisms in generally uniform suspension in the mixed liquor.

As shown in FIGS. 1 and 3, the gas supply means comprises a conduit 120 horizontally mounted in generally parallel alignment with and preferably vertically beneath the longitudinal axis of sidewall 20, and extending substantially from sidewall 22 to sidewall 24. As shown in FIG. 3, the conduit is provided with a plurality of orifices 122 therethrough providing fluid communication between the inside of the conduit and the treatment chamber. Preferably, the orifices 122 are uniformly sized and spaced along the length of conduit 120 to provide a uniform supply of oxygen containing gas along the length of the conduit. In addition, the orifices 122 are preferably disposed along a lower portion of the conduit 120, as shown in FIG. 3, to minimize passage of solid matter into the conduit 120 if the system should need to be shut down. The gas supply means further comprises means for supplying an oxygen containing gas under pressure to the conduit, such as pump 124 and interconnecting conduit section or sections 126 providing fluid communication between the pump 124 and the conduit 120. For most practical purposes, the gas supplied to conduit 120 will be air. Under some circumstances, however, it may be desirable to supply pure oxygen to the conduit 120 to be dispersed throughout and dissolved in the mixed liquor in treatment chamber 25. The pressure of the gas supplied to conduit 120 may be varied for particular design parameters to optimize mixing of the mixed liquor in the treatment chamber, as heretofore described.

RAW SEWAGE INLET MEANS

The apparatus of the invention further comprises raw sewage inlet means 32 for supplying raw sewage to the first treatment unit 12 of the series. In the embodiment of FIGS. 1, 3 and 4, inlet means 32 comprises a substantially vertically oriented relatively short length conduit member 130 having open top and bottom end portions 132, 134, respectively, and a substantially horizontally oriented conduit member 136 extending through endwall 22 of the first treatment unit of the series at about, or slightly above, the upper liquid level of the treatment chamber, the conduit member 136 having a first end portion in fluid communication with an intermediate portion of conduit member 130 and a second end portion in fluid communication with a source of raw sewage (not shown). Preferably, conduit member 136 extends through endwall 22 at a location somewhat above the liqid level 70 in the first unit of the series to prevent mixed liquor from treatment chamber 25 from backing up into the sewage inlet means.

CLARIFIED EFFLUENT OUTLET MEANS

Referring now to FIGS. 1, 4 and 6, the apparatus of the invention further comprises clarified effluent outlet means 34 for withdrawing clarified effluent from the last treatment unit 18 of the series. As shown in FIGS. 4 and 6, outlet means 34 comprises a first baffle means 140 vertically oriented in treatment chamber 25 of the last unit 18 of the series and having a first end portion 142 in fluid tight engagement with endwall 24 of the unit 18 and extending therefrom into the treatment chamber 25 parallel to longitudinal axis 44 to a second end portion 144 thereof, and a second baffle means 146 vertically oriented in treatment chamber 25 and having a first end portion 148 in fluid tight engagement with the second end portion 144 of the first baffle means 140 and extending perpendicularly outward therefrom to a second end portion 150 in fluid tight engagement with sidewall 20. The first and second baffle means extend from sidewall 20 at a location above the upper liquid level 70 in the treatment chamber vertically downward to an intermediate location in the treatment chamber substantially below the liquid level 70. The first and second baffle means are arranged to provide a quiescent zone 152 in the chamber 25 to allow any solid particulate matter, and primarily biological sludge, to settle from liquid in the quiescent zone, the settled solid particulate matter being continuously remixed in the mixed liquor in treatment chamber 25 and the supernatant being drawn from the quiescent zone as clarified effluent. The outlet means 34 further comprises means for withdrawing the clarified effluent from the quiescent zone, such as relatively short length vertically oriented conduit member 154 having open top and bottom end portions 156, 158, respectively, and generally horizontally oriented conduit member 160 extending through endwall 24 of the unit 18 and having a first end portion 162 in fluid communication with an intermediate portion of the conduit member 154 at about the upper liquid level 70 of chamber 25 and a second end portion in fluid communication with a suitable disposal site (not shown) for the clarified effluent.

The outlet means 34 preferably further comprises skimming means, such as conduit 164, (FIG. 6) for continuously skimming the upper surface 166 of liquid in the quiescent zone 152 to remove any foam or floating matter from the quiescent zone and return the foam or floating matter to treatment chamber 25 for further biological degradation. Conduit 164 extends through first baffle means 140 and has a first end portion 168 adjacent and extending above the liquid level 166 in the quiescent zone 152 and a second end portion 170 adjacent the upper liquid level 70 in chamber 25. As mixed liquor in chamber 25 continuously flows in a semi-circular path as previously described, a hydraulic gradient is established between the first and second end portions of conduit 164, whereby foam or floating matter in quiescent zone 152 is continuously drawn through conduit 164 into the moving mass of mixed liquor in the treatment chamber. The outlet means 34 may additionally comprise conventional settling aids, (not shown) such as settling tubes, inclined settling plates and the like, to enhance settling of solid particulate matter from the mixed liquor in quiescent zone 152.

FLUID COMMUNICATION MEANS

The apparatus of the invention further comprises fluid communication means 36 for providing fluid communication between an intermediate top portion of each successive unit of the series and determining an upper liquid level in the treatment chamber of each unit of the series. As shown in FIGS. 1, and 3 fluid communication means 36 comprises a vertically oriented first conduit 170 adjacent an end wall of one of the units of the series in an upper portion of the treatment chamber of the unit having an upper end portion extending above the liquid level in the treatment chamber and a lower end portion extending beneath the liquid level in the treatment chamber, a vertically oriented second conduit 172 in the next successive unit of the series having a similar relationship to the upper liquid level in the treatment chamber thereof, and a substantially horizontally oriented third conduit 174 providing fluid communication between intermediate portions of the first and second conduits at about the upper liquid level in the treatment chambers of the units. The horizontally oriented third conduit provides for overflow of fluid from one unit to the next successive unit, thereby establishing the upper liquid level in the one unit, while the horizontally oriented conduits prevent any foam or floating matter from passing between successive units. The fluid communication means are preferably slightly vertically lowered between successive units to provide a slightly lower liquid level 70 in each unit than the liquid level in the next preceding unit, as indicated in FIG. 4, thereby preventing backflow of mixed liquor between the units. In addition, the fluid communication means are preferably horizontally offset from the vertical center of each unit to prevent the remote possibility of solids entering one end of a unit of the series and "skipping" across the moving surface of mixed liquor in the treatment chamber to pass directly out of the treatment chamber and into the next successive unit of the series.

OPERATION

Raw sewage enters the treatment chamber 25 of the first treatment unit 12 of the series via raw sewage inlet means 32. Mixed liquor in the treatment chamber 25 is in continuous movement in the flow path of FIG. 5 due to the action of gas supply means 30 which provides an oxygen containing gas under pressure to interact with the mixed liquor and continuously raise the mixed liquor upward interbetween the first and second baffle means 26, 28 of the unit. As the mixed liquor between the first and second baffle means is raised, an airlift is created which draws mixed liquor from beneath and on the outside of the baffle means into the area between the baffle means and establishes the continuous, uniform semi-circular flow path of FIG. 5. The continuous flow of mixed liquor conforms to the circular cross sectional configuration of the inside surface of sidewall 20 and results in complete and thorough mixing of waste matter in the sewage and maintains a constant, intimate contact between the waste matter and microorganisms and oxygen in the mixed liquor. Since there are no "dead spots" in the treatment chamber, the mixing action continuously scours the inside surface of sidewall 20 and maintains solid waste materials in generally uniform suspension throughout the mixed liquor, thereby eliminating anaerobic decomposition, or putrefaction, of the organic matter. As raw sewage enters the first unit of the series, an abundant supply of digestible organic matter is added to the treatment chamber 25, providing an ideal environment for the growth and reproduction of aerobic microorganisms in the mixed liquor.

As raw sewage is added to the first treatment unit of the series, mixed liquor in the first unit is displaced through the fluid communication means into the next successive unit 14 of the series. The continuous movement and mixing action of mixed liquor in unit 14 is the same as in unit 12. In unit 14, however, no new organic matter is introduced into the mixed liquor, so that microorganisms in the mixed liquor in unit 14 must rely on a diluted excess of organic matter from the mixed liquor in unit 12 for any continued growth and reproduction or maintenance of the microorganism population. Treatment units 12 and 14 are designed for a particular sewage loading range so that the organic matter substrate concentration in the mixed liquor will be substantially reduced before passage of the mixed liquor out of unit 14.

As mixed liquor is displaced out the first treatment unit 12 into treatment unit 14, a corresponding amount of mixed liquor is displaced out of unit 14 into the next successive treatment unit 16. Unit 16 has a similar flow of mixed liquor and continuous mixing action as units 12 and 14. Since organic matter in the mixed liquor is substantially reduced prior to displacement of the mixed liquor from unit 14, microorganisms in unit 16 are forced by their environment out of a phase of growth and reproduction or population maintenance, and into a phase of aerobic autodigestion, i.e., endogenous respiration, and intercell cannibalization, thereby resulting in a substantial net decrease in suspended biological sludge or microorganism population in the mixed liquor.

As mixed liquor is displaced out of treatment unit 14 into the next successive treatment unit 16, a corresponding amount of mixed liquor is displaced out of treatment unit 16 into the last treatment unit 18 of the series. The flow of mixed liquor and complete mixing action in unit 18 is similar to that in units 12, 14 and 16. In unit 18, however, the mixed liquor contains a relatively large population of microorganisms, and the presence of oxygen and the further lack of organic matter substrate as a food source result in continued autodigestion and cannibalism of the microorganisms. A portion of the mixed liquor in treatment unit 18 flows out of the normal flow path, under the baffle means 140, 146 and into quiescent zone 152. Any remaining biological sludge, or other solid particulate matter, in the mixed liquor settles to the bottom of the quiescent zone and reenters the semi-circular flow path in unit 18 to continue autodigestion, resulting in an indefinite retention of biological sludge in the last unit of the series and thereby providing for complete oxidation of biological sludge and organic matter substrate prior to effluent discharge from the system. The supernatant in the upper portion of quiescent zone 152 thereby becomes a solids free effluent which is displaced from the quiescent zone as mixed liquor is displaced into treatment unit 18 from treatment unit 16.

Treatment units 12, 14, 16, 18 are designed for a particular raw sewage load capacity so that sufficient organic matter substrate of the raw sewage is present to support a growing, expanding microorganism population in the first unit 12 of the series. As mixed liquor is displaced into the second unit 14 of the series, the organic matter substrate in the mixed liquor displaced from the first unit is diluted, preferably to an extent insufficient to support substantial continued growth of the microorganism population, thereby forcing the population into a phase of population maintenance, or status quo. In the third unit 16 of the series, the organic matter substrate in the mixed liquor is even further diluted, preferably to an extent insufficient to provide for continued maintenance of the microorganism population, thereby forcing the population into a phase of autodigestion or endogenous respiration, where the microorganisms become self-consuming. In the last unit of the series, the organic matter content of the mixed liquor is even furthr diluted and, since the microorganism content of the mixed liquor is retained indefinitely in the treatment chamber until autodigestion is complete, an equilibrium at a relatively high ratio of microorganisms to external organic matter substrate is approached which forces the microorganism population into an even more pronounced phase of autodigestion, resulting in substantially complete oxidation of both organic matter substrate and biological solids prior to effluent discharge from the system.

Although the foregoing description is applicable to optimum design criteria for a particular application, it is to be understood that the method and apparatus of the invention is capable of handling severe under and overloading stresses without adversely affecting effluent quality by experiencing natural shifts in the previously described environmental conditions of the separate treatment units.

As compared with conventional activated sludge systems and prior extended oxidation systems, the methods and apparatus of the present invention provide improved velocity gradients and energy input into the treatment system resulting in chemical oxidation demand removal and improved oxygen uptake in mixed liquor having substantially reduced solids levels. Although the precise mechanisms involved in obtaining these improved results are not presently completely understood, it is believed that they are a direct result of obtaining an improved ratio of respiration to synthesis in the microorganism population, an increased frequency of contact between the microorganism cells and organic matter substrate, the production of relatively smaller floc particles in the mixed liquor of the system with resultant improved utilization of organic matter substrate and oxygen uptake by the microorganisms, an increase in the rate of oxygen transfer through microorganism cell membranes, and/or maintenance of a relatively higher dissolved oxygen concentration in the mixed liquor through increased turbulence and agitation in the system.

For most purposes, it has been found that satisfactory results are obtained with an average mixed liquor detention time of about 10 hours in each unit, it being understood that the retention time for biological sludge in the last treatment unit 18 is extended indefinitely.

Although the foregoing apparatus has been described in association with a preferred embodiment having four treatment units arranged in series, it is contemplated that the inventive concepts are equally applicable to embodiments having three or five or more treatment units, as heretofore described, arranged in series.

Figure 7:
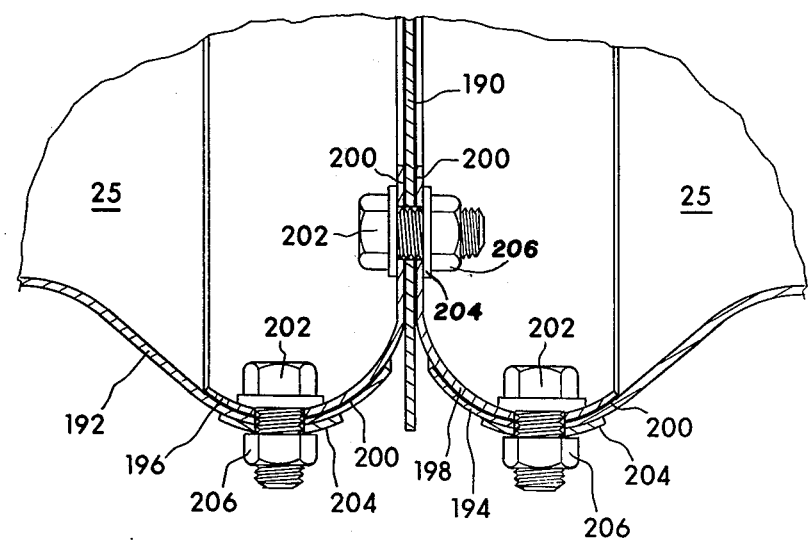
FIG. 7 is a top view in cross section showing an illustrative endwall common to two units of the apparatus of FIG. 1 and illustrative interconnection of the common endwall to the units.
Figure 8A:
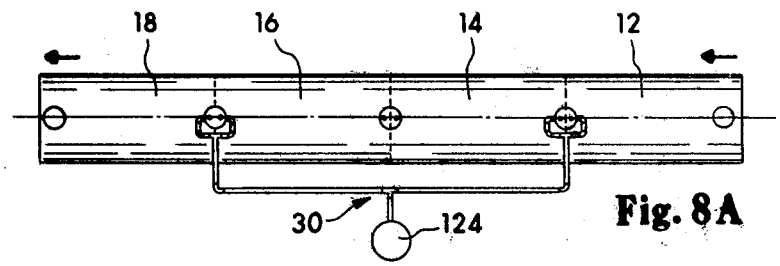
FIG. 8 is a schematic drawing showing illustrative alternative arrangements of the units of the apparatus of FIG. 1 in series.
Figure 8B:
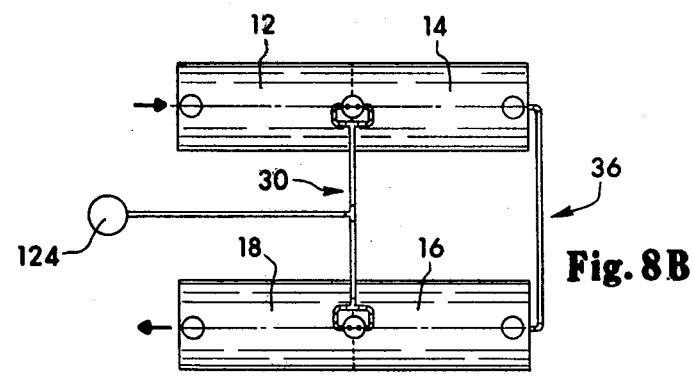
Figure 8C:
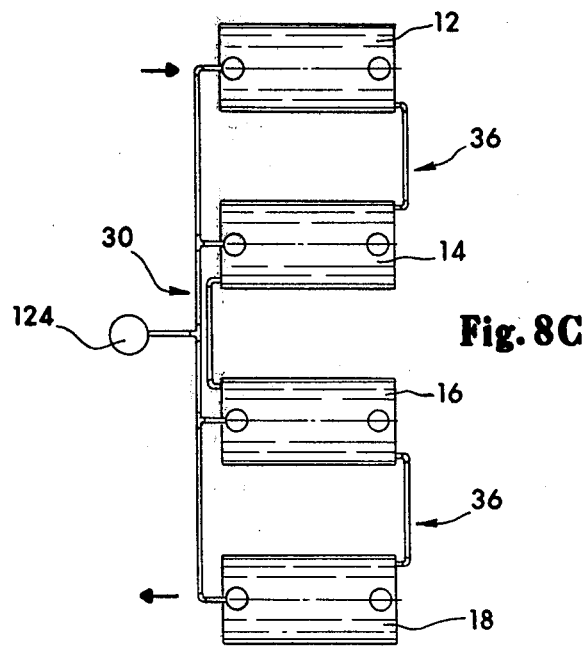

Referring now to FIG. 8, the treatment units of the invention may be variously arranged to suit particular installation requirements and flow capacities. Installation factors notwithstanding, the configuration of FIG. 8A is generally presently preferred for apparatus having a throughput capacity of up to about 8,000 gallons per day (gpd), the configuration of FIG. 8B is generally preferred for apparatus having a throughput capacity of about 8,000 to about 24,000 gpd and the configuration of FIG. 8C is generally preferred for apparatus having a throughput capacity of over 24,000 gpd. Where two or more successive units are arranged in longitudinal alignment with adjacent endwalls, such as in the configurations of FIGS. 8A and 8B, an endwall common to the successive units, or a bulkhead, may be used to replace separate endwalls in each unit. In such a case, the illustrative endwall/sidewall interconnection of FIG. 2 may be modified to provide for the common endwall, such as in the embodiment of FIG. 7 wherein endwall 190 is illustratively mounted for fluid tight engagement on sidewalls 192, 194 by means of interconnecting walls portions 196, 198, similar to interconnecting wall portion 54, FIG. 2, sealing means 200, threaded bolts 202, washers 204 and nuts 206.

While the inventive concepts have been described in association with a presently preferred embodiment of the sewage treatment apparatus, it is contemplated that various modifications will be apparent from the disclosure. Such modifications are intended to be within the scope of the attached claims, except insofar as precluded by the prior art.

What is claimed is:

1. Apparatus for treating sewage to produce a clarified effluent and having a plurality of treatment units arranged in serial fluid communication, comprising:
a series of treatment units including a first unit of the series, a last unit of the series and at least one intermediate unit of the series, each such unit comprising an elongated sidewall of generally circular cross-sectional configuration having first and second end portions and a central longitudinal axis extending therethrough; first and second endwall portions mounted in fluid tight engagement with the first and second end portions of the sidewall to define a generally cylindrically shaped sewage treatment chamber therewithin; first and second baffle means vertically mounted in spaced relationship in the sewage treatment chamber longitudinally of and on opposite sides of te longitudinal axis and in spaced relationship to the sidewall for directing the flow of mixed liquor within the sewage treatment chamber; a conduit mounted in the treatment chamber in substantially parallel relationship relative to the longitudial axis, and being in substantially vertical alignment therewith, and having orifices therein providing fluid communication between the inside of the conduit and the treatment chamber for supplying an oxygen containing gas to the treatment chamber at a location intermediate the first and second baffle means in a lower portion of the treatment chamber to cause sewage in the chamber to rapidly rise vertically upward between the first and second baffle means and then circumferentially outward and downward in a continuous semi-circular path to the bottom of the treatment chamber and then vertically upward again between the first and second baffle means to cause an intimate and thorough mixing of the gas with the sewage in the treatment chamber and to thereby maintain relatively heavy particulate solid matter in generally uniform suspension throughout the sewage in the treatment chamber, and means for supplying an oxygen containing gas under pressure to the conduit;

inlet means for supplying raw sewage to the first unit of the series;

means for providing a quiescent zone in the last unit of the series;

outlet means for withdrawing clarified effluent from the quiescent zone at about the upper liquid level thereof; and fluid communication means for providing fluid communication between an intermediate top portion of each successive unit of the series and determining an upper liquid level in the treatment chamber of each unit of the series.

2. The apparatus of claim 1 wherein the series comprises two intermediate units.

3. The apparatus of claim 1 wherein the first and second baffle means comprises:

a first elongated frame member extending longitudinally of the sidewall from the first end wall in a lower portion of the treatment chamber in spaced relationship relative to the sidewall, a second elongated frame member extending longitudinally of the sidewall vertically above the first frame member from the first endwall to the second endwall in an upper portion of the treatment chamber in spaced relationship relative to the sidewall, and;

a relatively rigid panel member fixedly mounted on and extending between the first and second frame members.

4. The apparatus of claim 1 wherein the conduit extends substantially from the first end wall to the second end wall and is spaced from and vertically beneath the longitudinal axis.

5. The apparatus of claim 1 wherein the first or second wall of at least one of the units provides a common endwall for at least another one of the units.

6. The apparatus of claim 1 wherein the fluid communication means comprises a vertically oriented first conduit adjacent an endwall of one of the units of the series in an upper portion of the treatment chamber thereof, having an upper end portion extending above the liquid level in the treatment chamber and a lower end portion extending beneath the liquid level in the treatment chamber, a vertically oriented second conduit in the next successive unit of the series in an upper portion of the treatment chamber thereof, having an upper end portion extending above the liquid level in the treatment chamber and a lower end portion extending beneath the liquid level in the treatment chamber and a substantially horizontally oriented third conduit providing fluid communication between intermediate portions of the first and second conduits at about the liquid level in the treatment chambers in the units.

7. The apparatus of claim 1 wherein the means for providing the quiescent zone comprises:

a first baffle means vertically oriented in the treatment chamber of the last unit of the series having a first end portion in fluid tight engagement with an endwall of the last unit of the series and extending therefrom in generally parallel relationship to the longitudinal axis into the treatment chamber to a second end portion; and a second baffle means vertically oriented in the treatment chamber of the last unit of the series having a first end portion in fluid tight engagement with the second end portion of the first baffle means and extending perpendicularly outwardly therefrom to a second end portion in fluid tight engagement with the sidewall of the last unit of the series, the first and second baffle means defining a quiescent zone in the treatment chamber of the last unit of the series.

* * * * *